United States Patent [19]
Taguchi et al.

[11] Patent Number: 5,659,206
[45] Date of Patent: Aug. 19, 1997

[54] ELECTRICAL CIRCUIT SYSTEM INCLUDING VOLTAGE DETECTOR TO SELECTIVELY HALT OPERATION OF AN ELECTRICAL CIRCUIT

[75] Inventors: Fumiya Taguchi, Kanagawa-ken; Kouji Sato, Tokyo, both of Japan

[73] Assignee: Nikon Corporation, Tokyo, Japan

[21] Appl. No.: 354,869

[22] Filed: Dec. 9, 1994

[30] Foreign Application Priority Data

Dec. 13, 1993 [JP] Japan ................................. 5-341235

[51] Int. Cl.⁶ ............................................. H02J 1/00
[52] U.S. Cl. .................. 307/11; 307/12; 307/24; 307/32; 307/34; 307/31; 307/39; 307/86; 307/64; 307/66
[58] Field of Search ............................ 307/11, 12, 24, 307/32, 34, 31, 39, 86, 64, 66

[56] References Cited

U.S. PATENT DOCUMENTS

| | | | |
|---|---|---|---|
| 4,181,842 | 1/1980 | Elias et al. | 307/66 |
| 4,300,090 | 11/1981 | Weber | 323/311 |
| 4,324,468 | 4/1982 | Tano et al. | 354/149 |
| 4,384,776 | 5/1983 | Takami et al. | 354/127 |
| 4,437,018 | 3/1984 | Manley | 307/38 |

FOREIGN PATENT DOCUMENTS 5-59414   8/1993   Japan.

*Primary Examiner*—William M. Shoop, Jr.
*Assistant Examiner*—Kim Lockett
*Attorney, Agent, or Firm*—Oliff & Berridge

[57] ABSTRACT

An electrical circuit has a power source line from a battery. The power source line is divided into a primary side and a secondary side by a device, such as, for example, a diode. A high current load circuit is connected to the primary side and a lower current device, such as, for example, a display-related circuit and a capacitor are connected to the secondary side. The display-related circuit continues to receive adequate power when the battery voltage drops due to operation of the high current load circuit. In addition, a voltage detector is connected to the secondary side, where the voltage fluctuates less than on the primary side. The voltage detector controls operation of the high current load circuit. As a result, the high current load circuit can be efficiently driven.

20 Claims, 8 Drawing Sheets

ELECTRICAL CIRCUIT SYSTEM INCLUDING VOLTAGE DETECTOR TO SELECTIVELY HALT OPERATION OF AN ELECTRICAL CIRCUIT

BACKGROUND OF THE INVENTION

1. Field of the Invention

The present invention relates to an electrical circuit system that uses a D.C. power source such as a battery.

2. Description of Related Art

In various devices that use batteries as a power source, control of the various circuit blocks of the devices is generally conducted by a CPU such as a microcomputer. In this case, the same battery supplies power to the CPU as well as to the various circuit blocks.

FIG. 7 is a block diagram showing an example of a device that uses a battery as the power source. With this device, a DC-DC converter 2, a strobe charging circuit 3A and other circuits 4 are connected to the battery 1, and power is supplied from the battery 1. Furthermore, the CPU 4A is connected to the output of the power supply circuit 14. Charging by the strobe charging circuit 3A is controlled by a signal input into the CTL terminal. In other words, the strobe charging circuit 3A is controlled by the output of an AND gate 8, which finds the logical sum of the output of a comparator 6, which monitors the voltage of the battery 1 using a standard voltage source 5 as a standard and uses the output of a latch circuit 7 that is controlled by the CPU 4A. In addition, on the DC-DC converter 2 side of comparator 6 is a back-up capacitor 9 which adds a capacitive component to the output charge of the DC-DC converter.

With this kind of device, when the strobe charging circuit 3A moves to a charging state, the voltage from the battery 1 starts to drop because of the high current load of the strobe charging circuit 3A. Furthermore, when the battery voltage drops as far as the minimum voltage needed to maintain the output of the DC-DC converter 2, it becomes difficult to guarantee proper operation of the CPU 4A which is connected to the output of the DC-DC converter. Consequently, a standard voltage (supplied by a standard voltage source 5) for the comparator 6, which detects the battery voltage, is set at a voltage higher than this minimum voltage. When the battery voltage drops below the standard voltage, the CTL terminal of the strobe charging circuit 3A is controlled via the AND gate to halt the charging operation of the strobe charging circuit 3A. When the charging operation is halted, the battery voltage rebounds, and when the voltage has rebounded above a certain hysteresis amount, the charging operation is started again.

FIGS. 9(a)–9(b) are waveform diagrams showing the state of charging or not charging of the strobe charging circuit 3A. Here, FIG. 9(a) shows the waveform of the strobe charging circuit 3A, while FIG. 9(b) shows the waveform of the battery voltage.

The battery voltage waveform fluctuates dramatically when this kind of charging control is conducted on the strobe charging circuit, as shown in FIG. 9(b). Consequently, when the strobe charging circuit frequently repeats the operations of charging and not charging, the charging time is lengthened, and because the charging time increases, the user may become impatient. The other circuits 4, which use the same power source as the strobe charging circuit, also experience large voltage fluctuations. The battery voltage drops a large amount when the charging current is largest, immediately following strobe illumination. When circuit 4 includes display circuits such as LEDs that supply light to displays in the viewfinder, the LED brightness dims. If instead, in order to avoid this problem, the displays inside the viewfinder are extinguished during charging, the display information is not available at all in the viewfinder.

SUMMARY OF THE INVENTION

Accordingly, an object of the present invention is to provide a power source system for devices that use batteries in which, when the battery voltage drops due to a large load, such as by the operation of a strobe charging circuit, for example, that voltage drop does not have an effect on the other circuits, and large loads can be efficiently driven.

In order to achieve these and other objects, embodiments of the present invention provide an electrical circuit system equipped with a primary circuit that is connected to a D.C. power source such as a battery via a power source line, which draws large amounts of current when it is operated, and a secondary circuit that is connected to the battery via the power source line, and which draws a smaller amount of current than the primary circuit when it is operated, such that the primary circuit does not operate when the voltage of the power source line has dropped too far.

The electrical circuit system includes a power source line divider that divides the power source line between the primary circuit and the secondary circuit. A capacitor is connected to the secondary circuit side of the power source line so as to be in parallel with the secondary circuit. A voltage detection device detects the voltage of the power source line at the secondary circuit side of the power source line (i.e., the side to which the capacitor and secondary circuit are connected). The voltage detector halts operation of the primary circuit in accordance with the detected voltage.

The voltage detector causes the primary circuit to operate when the voltage on the power source line to which the secondary circuit and the capacitor are connected rises above a predetermined value.

The primary circuit can be, for example, a strobe charging circuit used in a camera, a motor driving circuit, and/or a magnetic driving circuit.

The secondary circuit can be, for example, a microcomputer, a memory IC, an LED driving circuit, and/or a motor driving circuit.

The power source line divider can be, for example, a diode and/or a switch which are simple and inexpensive.

The power source line divider divides the power source line between the primary circuit and the secondary circuit. The voltage detector detects the voltage of the power source line to which the secondary circuit and the capacitor are connected. The voltage detector causes operation of the primary circuit to halt in accordance with the detected voltage. As a result, when the battery voltage drops because of operation of the primary circuit, which is comprised of a high current load circuit, the secondary circuit can continue to operate.

In addition, the voltage detector causes the primary circuit to operate when the voltage on the power source line to which the secondary circuit and the capacitor are connected rises above a predetermined value. As a result, the primary circuit, which is a high current load circuit, is driven as efficiently as is possible.

The primary circuit can operate a magnet driving circuit, a motor driving circuit and/or a strobe charging circuit, which are high current load circuits, without interrupting proper operation of the secondary circuit.

In addition, the secondary circuit can operate a microcomputer, a memory IC, an LED driving circuit and/or a display circuit. Stable operation of these circuits can be accomplished even when the battery voltage drops because of operation of the primary circuit.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Preferred embodiments of the present invention will be described hereafter, with reference to the accompanying drawings.

Figure 1:
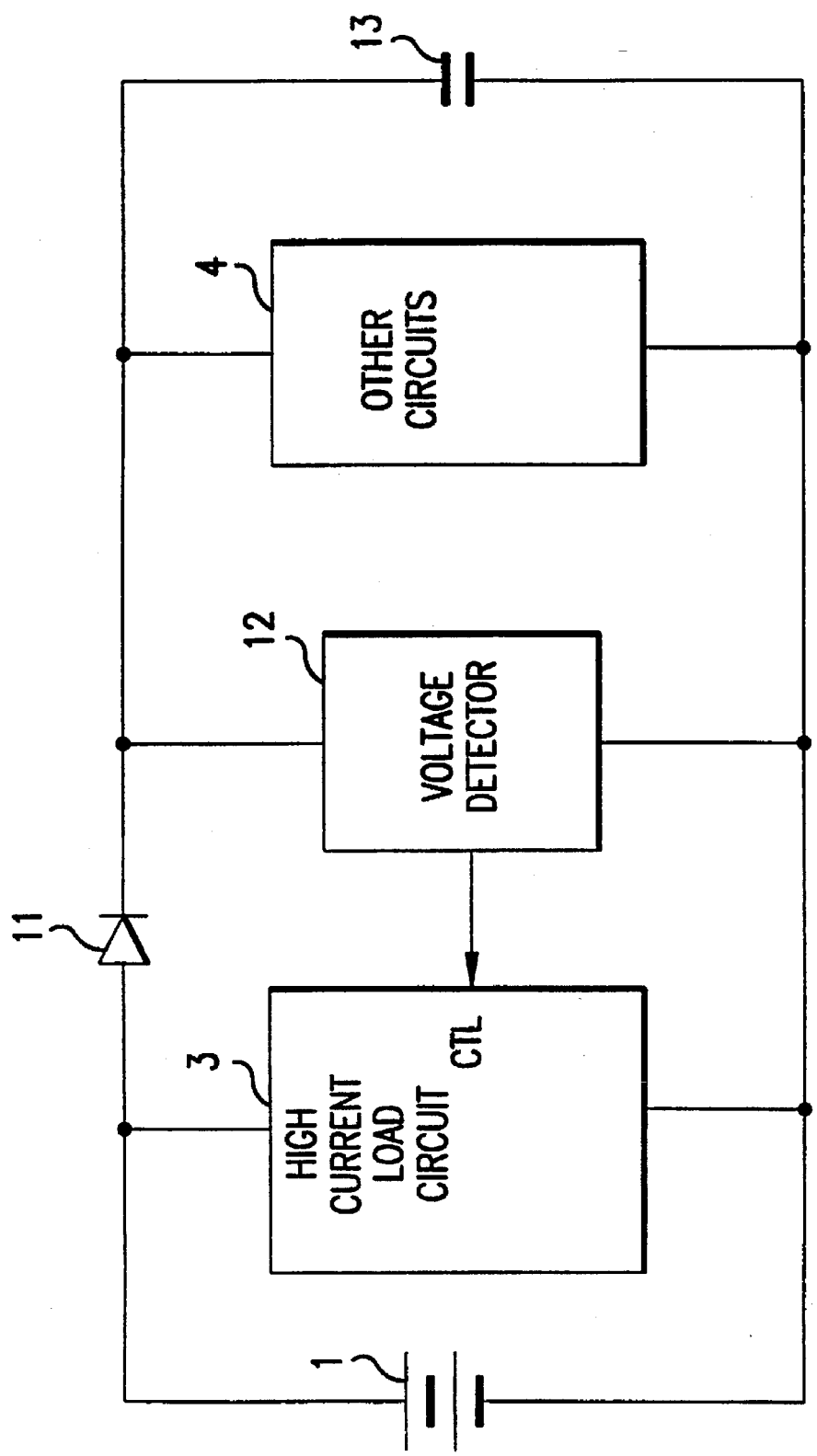
FIG. 1 is a block diagram showing a first embodiment of the invention.

FIG. 1 is a block diagram showing an embodiment of a battery-equipped power source system according to the invention. In FIG. 1, the power source system is comprised of a battery 1, a diode 11 (e.g., a Schottky diode) which divides the power source line from the battery 1, a high current load circuit 3, which is connected to the anode side of the diode and draws large amounts of current, a voltage detector 12, which is connected to the cathode side of the diode 11 and detects the battery voltage (i.e., the voltage supplied by the battery), other circuit(s) 4, which are also connected to the cathode side of the diode 11, and a back-up capacitor 13.

When a CPU such as a microcomputer or the like is used as one of the other circuits 4, it is possible to use a battery as the power source. However, other loads are generally connected to the battery, which also use the battery as a power source and which draw current when they are operated, causing the battery voltage to drop, making it impossible to supply power to the CPU in a stable manner. In addition, when an unstable supply of power is provided to the display circuit as well as to the CPU, the display will flicker. For example, LEDs that supply light for a display in the viewfinder will fluctuate in brightness.

To avoid this problem, in the system shown in FIG. 1, the power source line from the battery 1 is divided into a primary (anode) side and a secondary (cathode) side by the diode 11. A high current load circuit 3 such as, for example, a strobe charging circuit used in a camera, is connected on the primary side. Other circuits 4 such as a display circuit or the like, to which the effect of falling battery voltage is to be prevented, are connected on the secondary side. The battery voltage is detected by a voltage detector 12, which is connected on the secondary side of the diode 11.

When a large current is drawn by operation of the large current load circuit 3 and the battery voltage detected by the voltage detector 12 drops below a predetermined voltage, the voltage detector 12 operates through the CTL terminal of the high current load circuit 3 to halt operation of the high current load circuit 3. When the operation of the high current load circuit 3 is halted, the battery voltage rebounds. Later when the voltage detector 12 has detected that the battery voltage has rebounded adequately so that the voltage across the secondary side has increased to a second value which is larger than or equal to the predetermined voltage, the high current load circuit 3 is caused to again be operated.

While the battery voltage on the primary side of the diode 11 drops sharply when a large current is drawn by the large current load circuit 3, the battery voltage to the other circuits 4 connected on the secondary side of the diode 11 does not drop sharply because of the presence of diode 11 and capacitor 13. Rather, a relatively stable voltage is maintained by the back-up capacitor 13 and other capacitive components of the other circuits 4.

Consequently, when these other circuits 4 include, for example, a display circuit, flickering of the display is eliminated. In addition, the frequency of the falling voltage on the secondary side of the diode 11 diminishes. Accordingly, when, for example, a strobe charging circuit is used as the large current load circuit 3, the time needed to complete charging by the strobe charging circuit can be reduced.

By thus dividing the power source line from the battery into a primary side and a secondary side by a diode 11, and connecting a high current load circuit 3 to the primary side while connecting a capacitor 13 for backup use with a relatively large capacitance to the secondary side, and also connecting to the secondary side display-related circuits that will cause inconvenience to the user if the voltage fluctuates during operation, a construction is realized in which drops in the battery voltage caused by the operation of the high current load circuit 3 do not interrupt operation of the display circuit.

Figure 2:
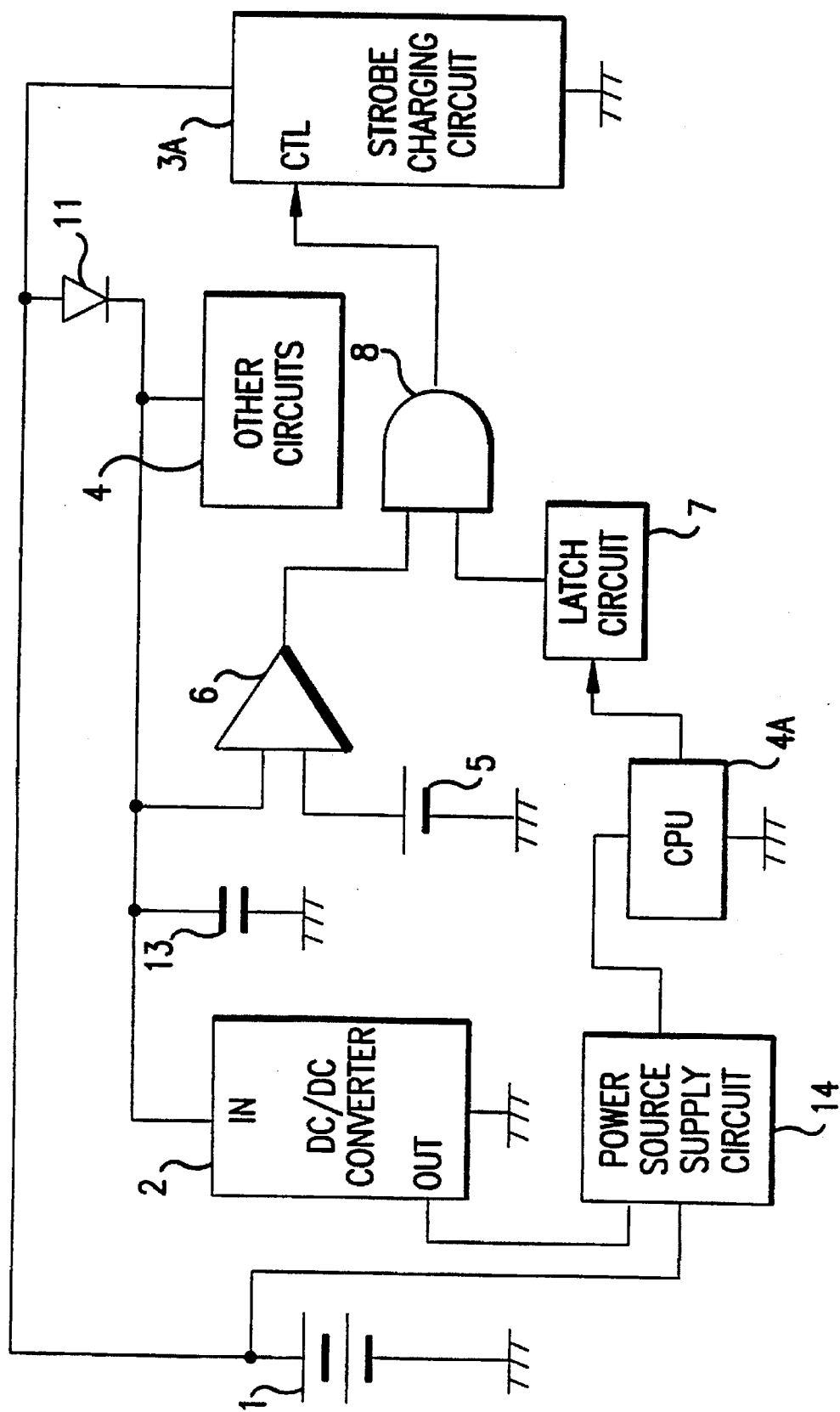
FIG. 2 is a block diagram showing a second embodiment of the invention.
Figure 3A:
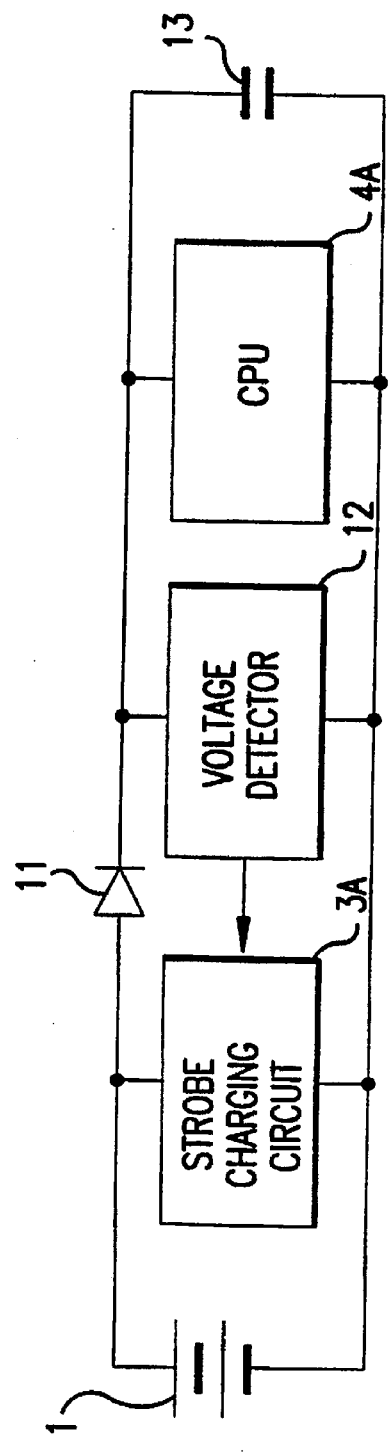
FIGS. 3(a)–3(c) are block diagrams showing third, fourth and fifth embodiments of the invention.
Figure 3B:
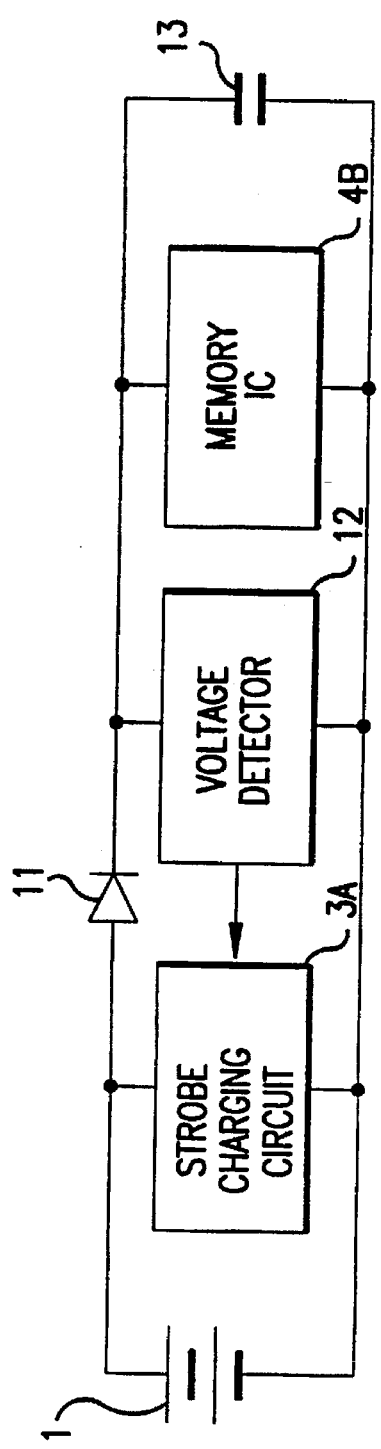
Figure 3C:
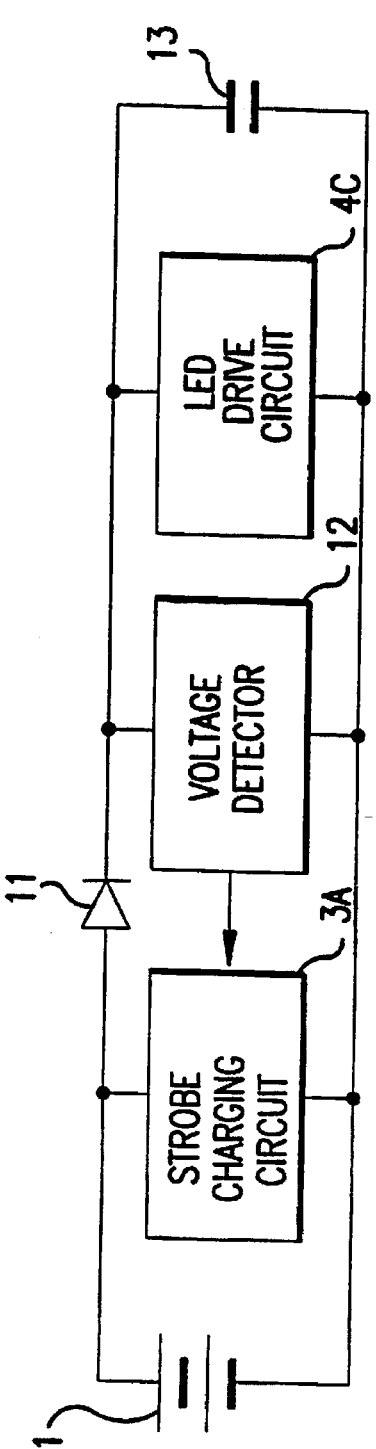
Figure 4A:
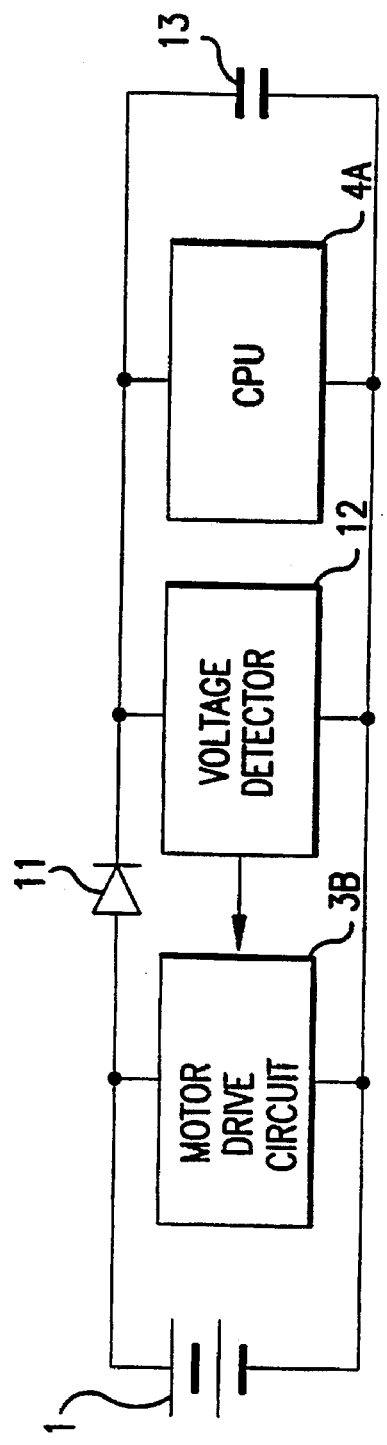
FIGS. 4(a)–4(c) are block diagrams showing sixth, seventh, and eighth embodiments of the invention.
Figure 4B:
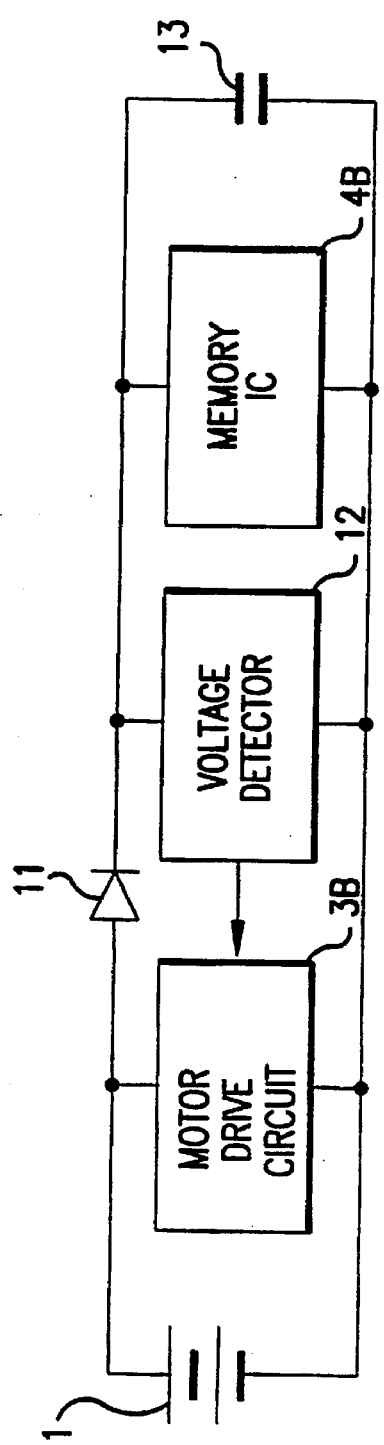
Figure 4C:
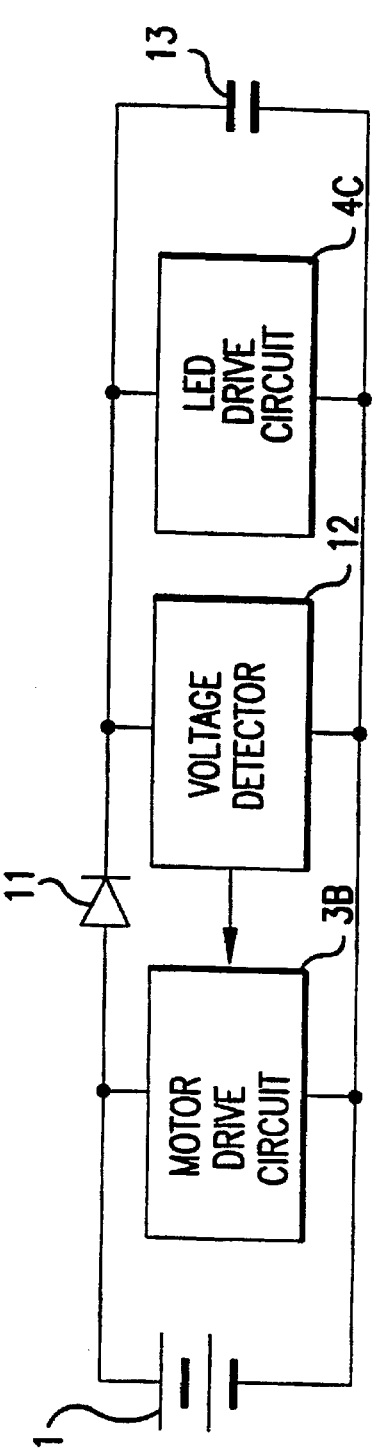
Figure 6A:
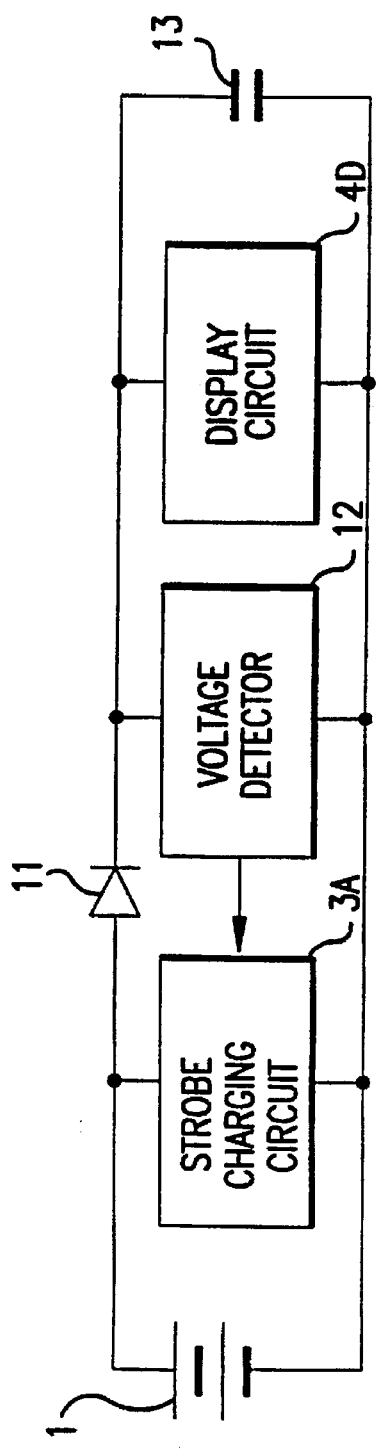
FIGS. 6(a)–6(c) are block diagrams showing twelfth, thirteenth, and fourteenth embodiments of the invention.
Figure 6B:
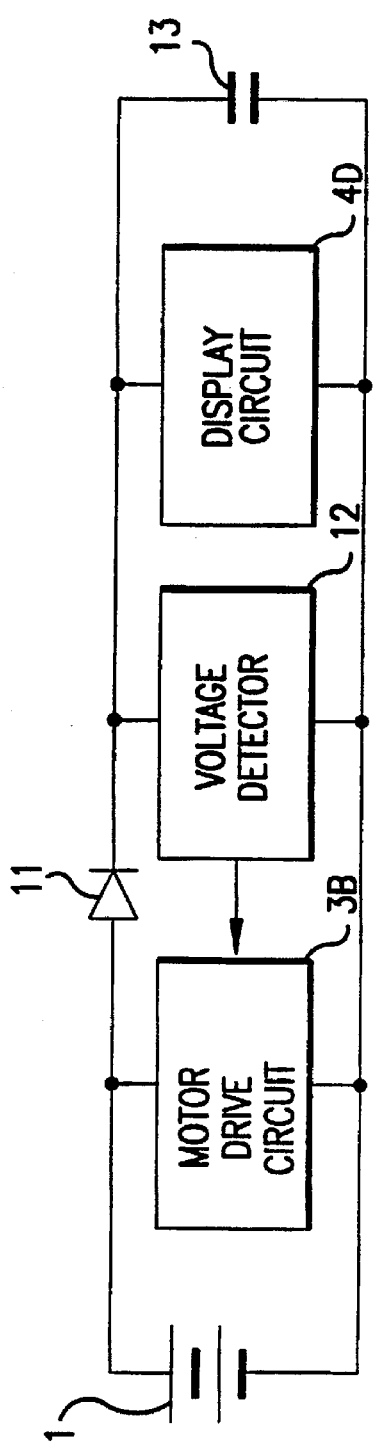
Figure 6C:
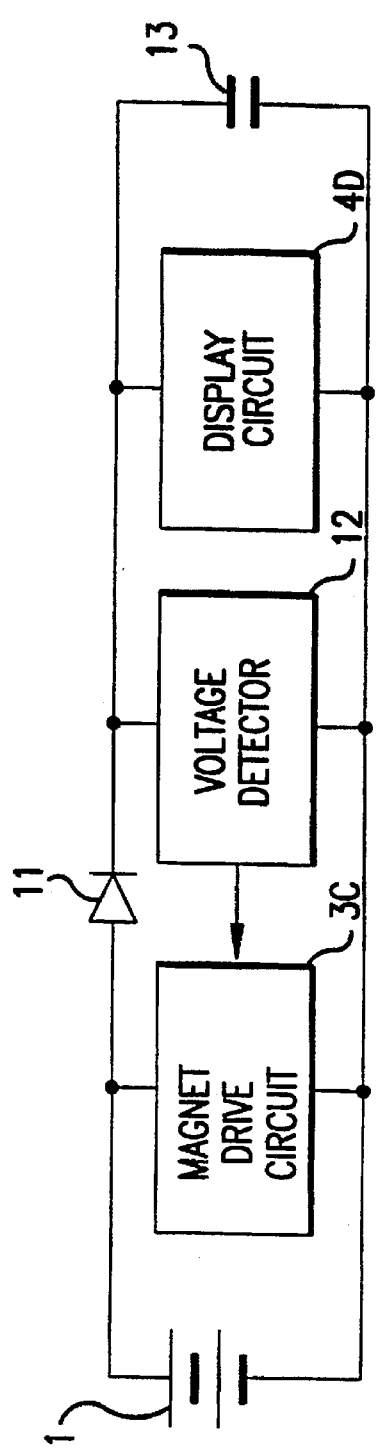
Figure 5A:
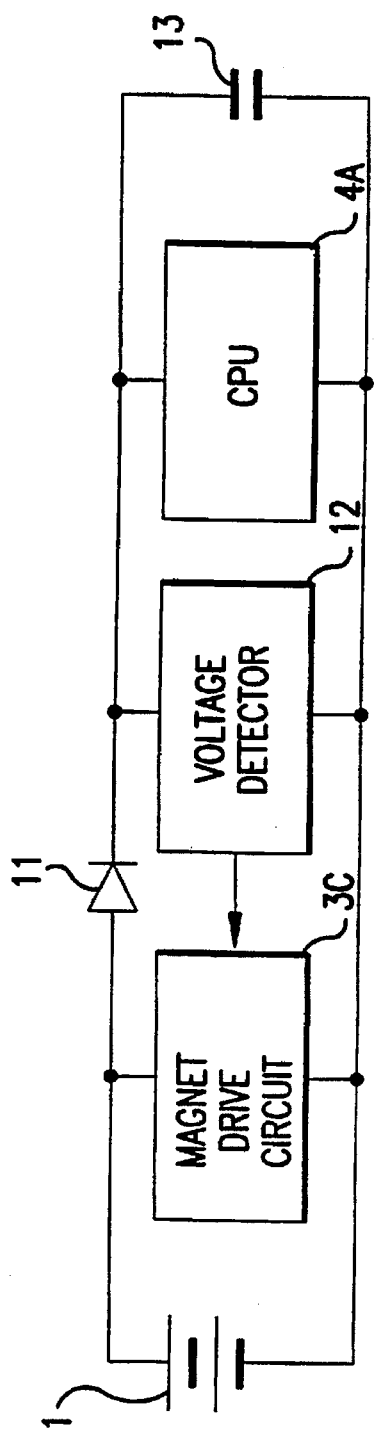
FIGS. 5(a)–5(c) are block diagrams showing ninth, tenth, and eleventh embodiments of the invention.
Figure 5B:
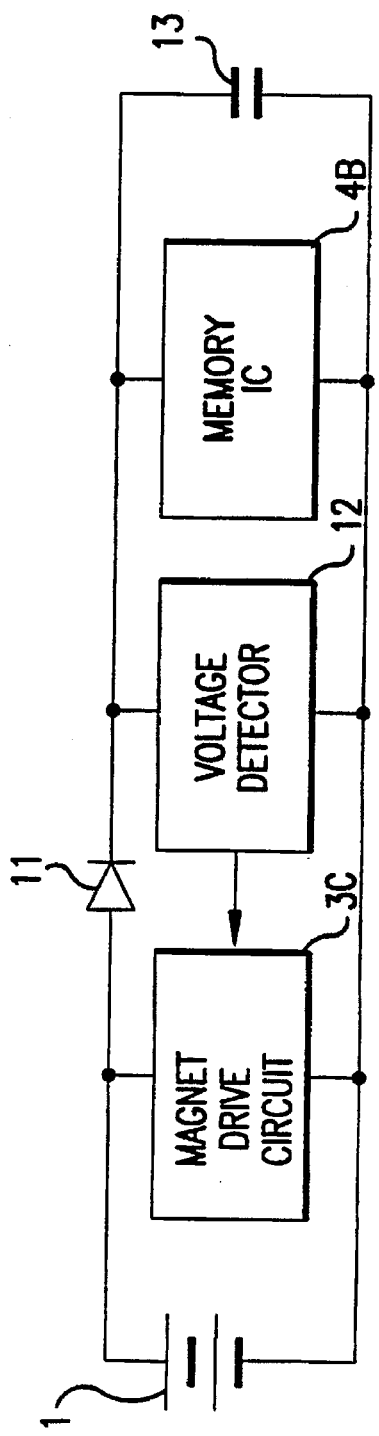
Figure 5C:
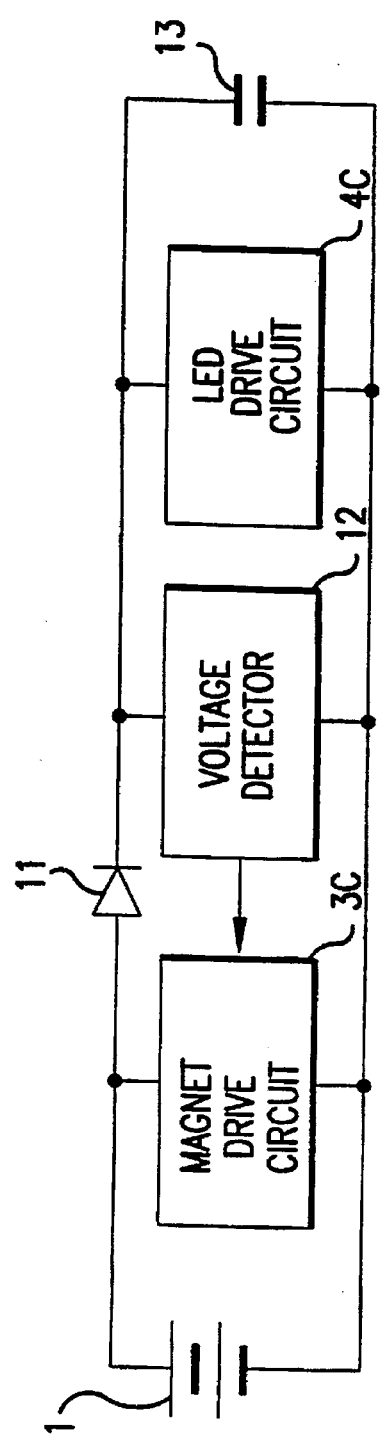
Figure 7:
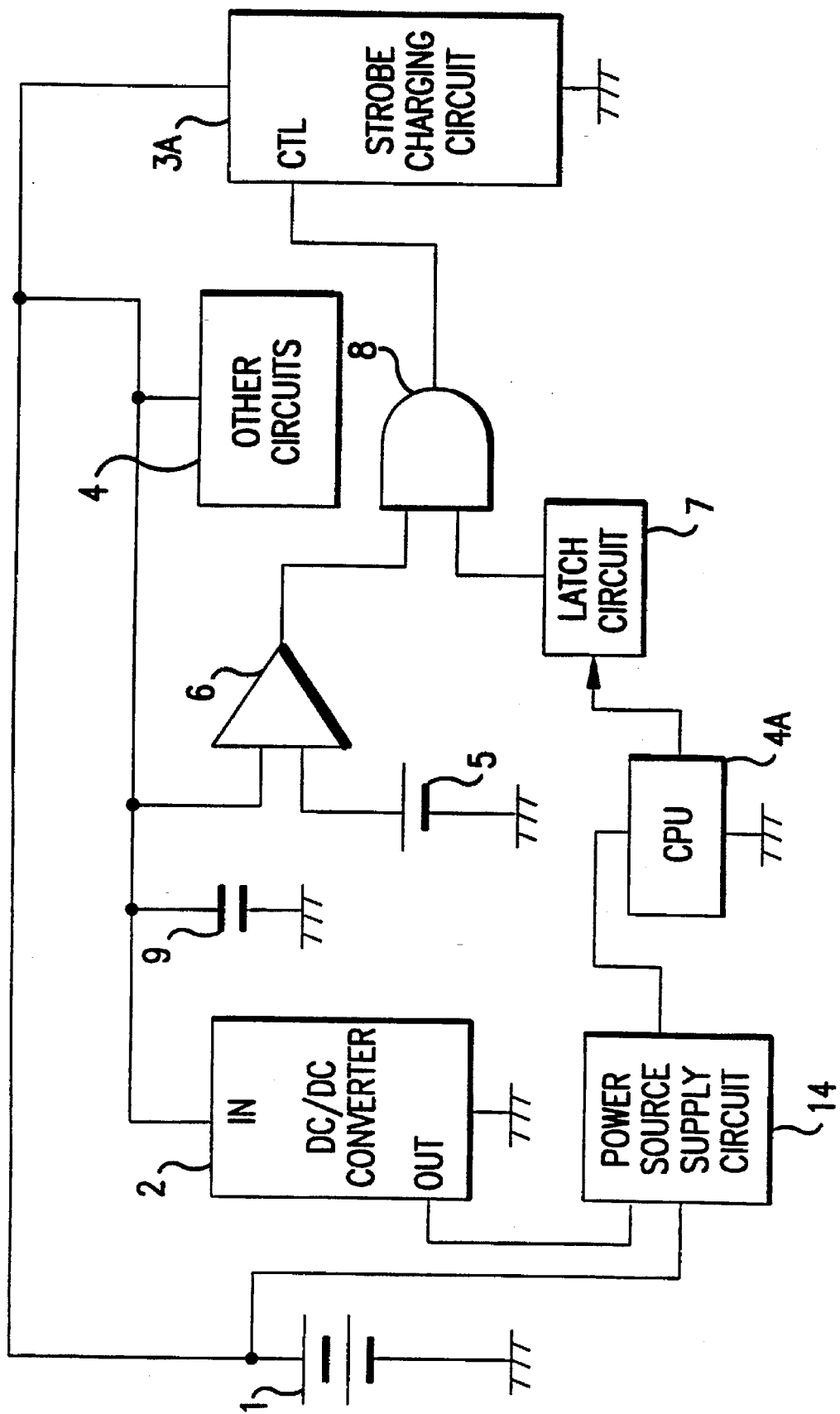
FIG. 7 is a block diagram showing a conventional device.

FIG. 2 is a block diagram showing another embodiment of the present invention, in which is shown an embodiment of the present invention applied to camera circuitry.

In FIG. 2, the power source line from the battery 1 is divided by the above-described diode 11 into a primary side and a secondary side, a strobe charging circuit 3A being connected to the primary side. In addition, a DC-DC converter 2, which supplies power to the CPU 4A and the like, is connected to the secondary side of the diode 11, along with the described back-up capacitor 13 and other circuits 4, such as a display circuit or the like.

The power source line is also connected to a power source supply circuit 14 to which the DC/DC converter 2 is also connected. The output of the power source supply circuit 14 provides the input for the CPU 4A.

In addition, a comparator 6, which detects the battery voltage, is connected to the secondary side of the diode 11. A standard power source 5 is connected to provide a voltage for comparison by the comparator 6, the voltage of the standard power source 5 being set slightly higher than the voltage needed to guarantee operation of the CPU 4A, for which power is supplied from the DC-DC converter 2.

This comparator 6 compares the voltage of the standard power source 5 and the battery voltage, and when the battery voltage is lower than the voltage of the standard power source 5, the comparator sends an output signal to an input of the AND gate 8. The other input of AND gate 8 is from latch circuit 7, which is controlled by the CPU 4A. Latch circuit 7 provides an operating state control signal that can be overridden by the signal from the voltage detector (i.e., comparator 6 and associated structure). Accordingly, a control signal output from the AND gate 8 is sent to the CTL terminal of the strobe charging circuit 3A. A control in the strobe charging circuit 3A halts the strobe charging operation when a proper control signal is received. As a result, the battery voltage rises, and the CPU can conduct stable operations at all times.

Details of the operation of the described example circuits are explained hereafter.

Figure 8A:
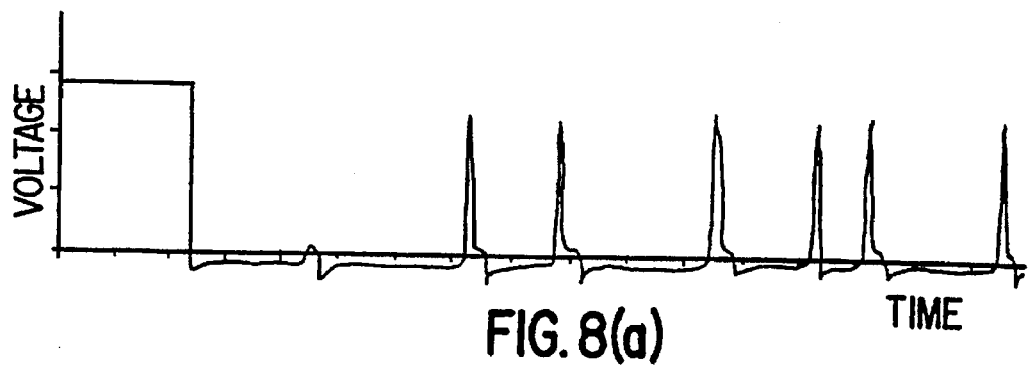
FIGS. 8(a) and 8(b) show the voltage waveforms of the strobe charging circuit and of the secondary circuit respectively of the present invention.
Figure 8B:
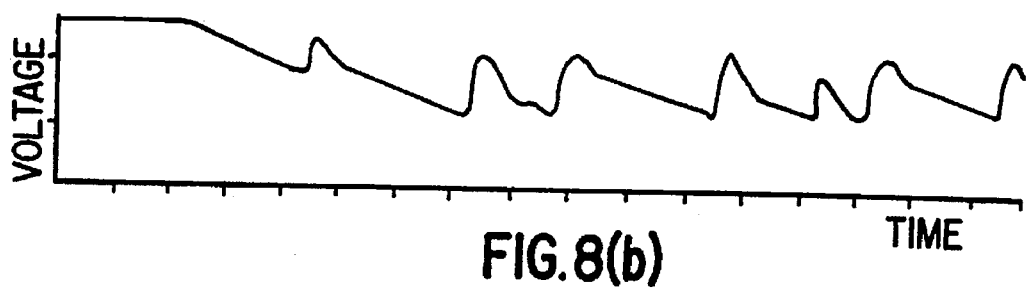
Figure 9A:
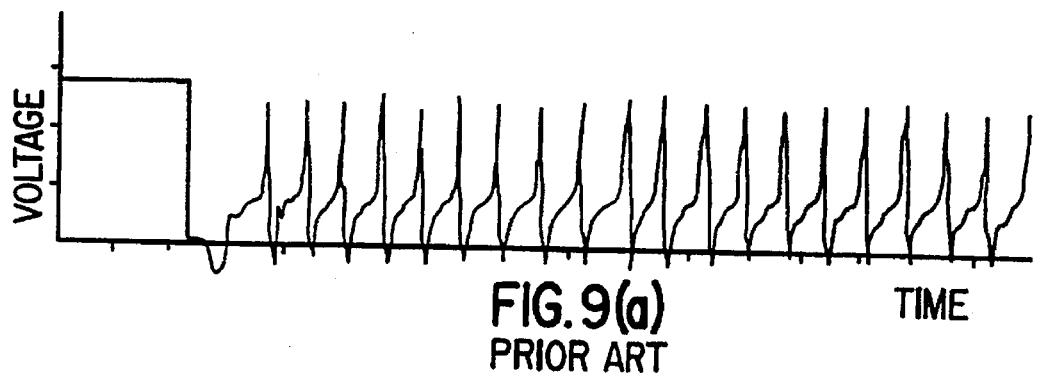
FIGS. 9(a) and 9(b) show the voltage waveforms of the strobe charging circuit and of the battery respectively of a conventional device.
Figure 9B:
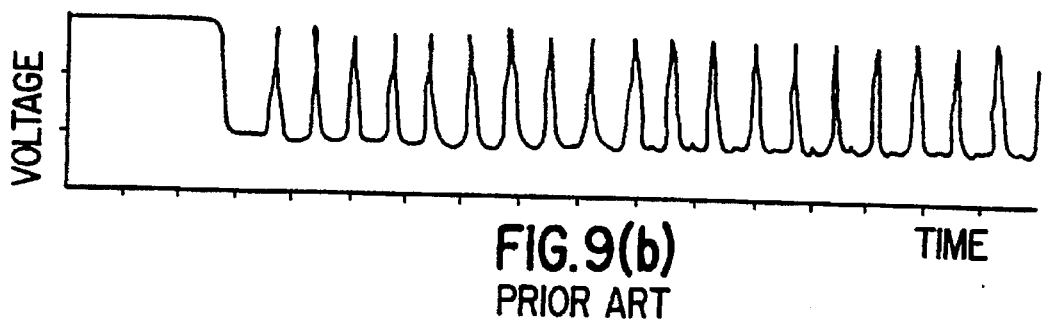

When the charging operation of the strobe charging circuit 3A is started, the voltage across the power source line on the primary side of the diode 11, i.e. the voltage at the terminal of the battery 1, drops sharply, as in the conventional example, shown in FIG. 9(b). However, the secondary side power source line to which the DC-DC converter 2 and the other circuits 4 are connected is separated from the primary side power source line by the diode 11. Because the back-up capacitor 13 and the other circuits 4 which are connected to the power source line on the secondary side of the diode 11 have capacitive components, the voltage across the secondary side power source line, as shown in FIG. 8(b), does not drop as sharply as does the voltage across the primary side power source line.

Because the comparator 6 used to control the strobe charging circuit 3A monitors the secondary power source line shown in FIG. 8(b) in which voltage fluctuation is small, the frequency of drops in voltage is significantly reduced compared with the conventional model. Accordingly, the total length of interruptions during the charging time is reduced in comparison to the conventional model. As a result, the charging time is greatly reduced compared to the conventional model. Experimental results have shown this charging time to be shortened by 40–50% compared with conventional models.

On the other hand, the brightness of the display-illuminating LEDs in the display circuit block among the other circuits 4 changes with the start of charging in the conventional model causing the LEDs to dim noticeably. However, with the present invention, the circuitry is divided by the diode 11 so that the drop in voltage is not transferred to the cathode side. The relatively large capacitive components on the cathode side prevent noticeable changes in brightness of the LEDs used for illumination.

In this way, because the strobe charging circuit 3A, which is a high current load circuit, is separated from the other circuits 4, a stable supply of power is provided to components such as the CPU, display circuit and the like that require a stable voltage even during sharp fluctuations in the battery voltage. As a result, the LEDs used for illuminating the display maintain a stable brightness. In addition, the strobe charging circuit 3A draws energy more efficiently from the battery than in the conventional model.

The present embodiment has been explained with reference to a power source system using a battery as applied to camera circuitry, but this system can also be applied to other devices that use a battery such as, for example, a portable cordless telephone or the like.

In addition, an explanation was presented for an example wherein a strobe charging circuit 3A used in a camera was the high current load circuit 3, but as shown in FIGS. 4(a)–4(c), 5(a)–5(c) and 6(a)–6(c), the present invention can also be applied to, for example, a motor driving circuit 3B that drives rotation of a motor and a magnet driving circuit 3C that drives a solenoid or the like.

As shown in FIGS. 3(a)–3(c), 4(a)–4(c), 5(a)–5(c) and 6(a)–6(c), examples of other circuits 4 that may be connected to the power source line on the secondary side of the diode 11 include a CPU 4A which may include a microcomputer or the like, a memory IC 4B, the above-described LED driving circuit 4C and a display circuit 4D, such as an LCD. By connecting each of the circuits to the secondary side power source line, flickering and changes in brightness of the display can be prevented and stable operation of the CPU 4A can be maintained. Also, as shown in FIGS. 4(a)–4(c), 5(a)–5(c), 6(b), and 6(c), examples of other high current load circuits that may be connected to the power source line on the primary side of the diode 11 include a motor drive circuit 3B and a magnet drive circuit 3C. When the voltage drops below a certain level, the switch is opened so that the high current load does not draw power from the capacitor 13. Thus, any structure that permits current to flow freely from the primary side to the secondary side, but not from the secondary side to the primary side, may be used as the power source line division means.

In addition, while the previous embodiments use a diode 11 as the power source division means, similar results can be obtained by providing a switch instead of the diode 11 and by controlling the opening and closing of the switch through the use of a voltage detection circuit.

As explained above, with the present invention, when the circuitry is powered by a battery, the power source line is divided by a power source line division means. The power source line division means is located between the primary circuit, which draws a large current during operation, and the secondary circuit, which draws less current than the primary circuit during operation. A voltage detector that detects the voltage of the power source line to which the secondary circuit and the capacitor are connected regulates the operation of the primary circuit in accordance with the detected voltage. A capacitor, connected to the divided power source line, provides power to the secondary circuit. Consequently, even when the battery voltage drops because of operation of the primary circuit, the secondary circuit continues to operate properly.

The voltage detector sends a signal to the control of the primary circuit when the voltage across the power source line to which the secondary circuit and the capacitor are connected rises above a predetermined value. The signal causes the primary circuit to operate again, thereby enabling the primary circuit, which is a high current load circuit, to be driven efficiently.

In addition, the primary circuit can include a number of circuits, including a magnet driving circuit, a motor driving circuit and a strobe charging circuit, all of which are high current load circuits. Consequently, these various circuits can be driven by the power source while the secondary circuit properly operates continuously.

The secondary circuit can include different electronic elements, including, for example, a microcomputer, a memory IC, an LED driving circuit and a display circuit. Stable operation of these circuits can be maintained even when the battery voltage drops because of operation of the primary circuit.

In addition, the power source line division means may be devices other than a diode, such as, for example, a switch.

The use of either a diode or a switch enables the power source line division means to be simple and inexpensive.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An electrical circuit comprising:

a D.C. power source;

a power source line connected to said D.C. power source;

means for dividing said power source line into a primary side and a secondary side so that current may flow freely from said primary side to said secondary side but not from said secondary side to said primary side;

a high current load circuit connected to said primary side;

a secondary circuit connected to said secondary side, said secondary circuit drawing less current than said high current load circuit, said secondary circuit including electrical charge storage means; and means for halting operation of said high current load circuit when a voltage across said secondary circuit decreases to a first value.

2. The electrical circuit of claim 1, wherein said electrical charge storage means provides current to said secondary circuit when the voltage across said secondary circuit decreases.

3. The electrical circuit of claim 2, further comprising means for starting operation of said high current load circuit when the voltage across said secondary circuit increases above a second value which is larger than or equal to said first value.

4. The electrical circuit of claim 1, further comprising means for starting operation of said high current load circuit when the voltage across said secondary circuit increases above a second value which is larger than or equal to said first value.

5. An electrical circuit comprising:

a battery;

a power source line connected to said battery;

a primary circuit that requires a first amount of current to operate, said primary circuit connected to said battery via said power source line;

a secondary circuit that is connected to said battery via said power source line, said secondary circuit requiring less current to operate than said primary circuit and including an electrical charge storage device;

a power source line dividing device that divides said power source line between said primary circuit and said secondary circuit so that current may flow freely through said power source line from said battery to said secondary circuit but not from said secondary circuit to said primary circuit;

a voltage detector that detects the voltage of the power source line at a side of said power source line dividing device containing said secondary circuit; and a controller connected to said voltage detector, said controller halting operation of said primary circuit when the detected voltage decreases to a first value.

6. The electrical circuit of claim 5, wherein said electrical charge storage device comprises a capacitor.

7. The electrical circuit of claim 5, wherein said electrical charge storage device provides current to said secondary circuit when said voltage in said power source line decreases.

8. The electrical circuit of claim 5, wherein said controller starts operation of said high current load circuit when said detected voltage increases above a second value which is larger than or equal to said first value.

9. The electrical circuit of claim 5, wherein said primary circuit includes at least a magnet driving circuit.

10. The electrical circuit of claim 5, where said primary circuit includes at least a motor driving circuit.

11. The electrical circuit of claim 5, wherein said primary circuit includes at least a camera strobe charging circuit.

12. The electrical circuit of claim 5, wherein said power source line dividing device includes a diode.

13. The electrical circuit of claim 5, wherein said secondary circuit includes at least an LED driving circuit.

14. The electrical circuit of claim 5, wherein said secondary circuit includes at least a memory integrated circuit.

15. The electrical circuit of claim 5, wherein said secondary circuit includes at least a microcomputer.

16. The electrical circuit of claim 5, wherein said secondary circuit includes at least a display circuit.

17. A method of driving an electrical circuit including a D.C. power source, a power source line connected to said D.C. power source, a dividing device that divides said power source line into a primary side and a secondary side so that current may flow freely from said primary side to said secondary side but not from said secondary side to said primary side, a high current load circuit connected to said primary side, and a secondary circuit connected to said secondary side, said secondary circuit including an electrical charge device, comprising the following steps:

(a) detecting a voltage across said secondary circuit; and (b) halting operation of said high current load circuit when the detected voltage decreases to a first value.

18. The method of claim 17, further comprising the step of providing current to said secondary circuit from an electrical charge storage device in said secondary circuit when the voltage across said secondary circuit decreases.

19. The method of claim 17, further comprising the step of starting operation of said high current load circuit when the voltage across said secondary circuit increases above a second value which is larger than or equal to said first value.

20. The method of claim 18, further comprising the step of starting operation of said high current load circuit when the voltage across said secondary circuit increases above a second value which is larger than or equal to said first value.

* * * * *